United States Patent
Minamisawa et al.

(10) Patent No.: US 7,595,353 B2
(45) Date of Patent: Sep. 29, 2009

(54) FLUORINE-CONTAINING PHOTOCURABLE POLYMER COMPOSITION

(75) Inventors: Hisanobu Minamisawa, Ichihara (JP); Mikio Yamahiro, Ichihara (JP); Akira Meguro, Ichihara (JP)

(73) Assignee: Chisso Corporation, Osaka (JP)

( * ) Notice: Subject to any disclaimer, the term of this patent is extended or adjusted under 35 U.S.C. 154(b) by 197 days.

(21) Appl. No.: 11/528,691

(22) Filed: Sep. 28, 2006

(65) Prior Publication Data

US 2007/0082968 A1 Apr. 12, 2007

(30) Foreign Application Priority Data

Sep. 29, 2005 (JP) .............................. 2005-283203

(51) Int. Cl.
*C08F 2/46* (2006.01)
*C08F 2/50* (2006.01)
*C08J 3/28* (2006.01)

(52) U.S. Cl. ...................... 522/112; 522/109; 522/110; 522/111; 522/99; 522/148; 522/149; 522/150; 522/153; 522/155; 522/156; 522/178; 522/182; 522/187; 522/184; 525/101; 525/148; 528/26; 428/411.1; 428/421; 428/446; 428/447; 428/448; 428/1.4; 428/1.32; 428/1.33; 428/1.5; 428/1.52; 428/1.55

(58) Field of Classification Search ................. 525/101, 525/148; 528/26; 522/109, 110, 111, 112; 428/411.1, 421, 446, 447, 448, 1.32, 1.33, 428/1.5, 1.52, 1.55, 1.4
See application file for complete search history.

(56) References Cited

U.S. PATENT DOCUMENTS

| 4,629,680 | A | * | 12/1986 | Iwasaki et al. | ............ 430/288.1 |
| 4,632,897 | A | * | 12/1986 | Barzynski et al. | ........... 430/260 |
| 4,686,168 | A | * | 8/1987 | Fujii et al. | .................. 430/326 |
| 5,153,101 | A | * | 10/1992 | Meier et al. | ............. 430/281.1 |
| 5,548,028 | A | * | 8/1996 | Tabb | ........................... 525/194 |
| 6,344,299 | B1 | * | 2/2002 | Sato et al. | ...................... 430/7 |
| 6,916,543 | B2 | * | 7/2005 | De et al. | ..................... 428/447 |

FOREIGN PATENT DOCUMENTS

| JP | 10-12377 | 1/1998 |
| JP | 2001-261761 | 9/2001 |
| JP | 2003-192749 | 7/2003 |
| JP | 2005-272506 | 10/2005 |

OTHER PUBLICATIONS

English Machine Translation, JP 2005-272506.*

* cited by examiner

*Primary Examiner*—Sanza L McClendon
(74) *Attorney, Agent, or Firm*—Hogan & Hartson LLP

(57) ABSTRACT

The invention provides a photocurable polymer composition having a fluorine-containing polymer and a fluorine-free polymer, and preferably further having a polymerizable double bond-containing compound and a photopolymerization initiator. The fluorine-containing polymer preferably includes a fluorosilsesquioxane skeleton.

18 Claims, No Drawings

FLUORINE-CONTAINING PHOTOCURABLE POLYMER COMPOSITION

CROSS REFERENCE TO RELATED APPLICATIONS

This application claims priority under 35 U.S.C. § 119 to Japanese Patent Application No. JP 2005-283203, filed Sep. 29, 2005, which application is expressly incorporated herein by reference in its entirety.

BACKGROUND OF THE INVENTION

1. Field of the Invention

The invention relates to a photocurable polymer composition. Furthermore, the invention relates to a transparent film produced from the polymer composition, and a liquid crystal display device and an EL (electroluminescence) display device each including the transparent film as a photospacer.

2. Description of the Related Art

One of the known approaches for forming a thin film on a substrate is the use of a photocurable polymer composition. An example of the known methods for obtaining a cured coating film includes applying, to a base material, a photocurable polymer composition that includes a fluorine-containing polymer having a double bond and a reactive diluent composed of acrylate or the like, and then photo-curing the applied composition (JP-A-2003-192749).

In addition, patterned transparent films have been used in a large number of parts of a liquid crystal display device such as a spacer, an insulating film, and a protective film. A patterned transparent film can be formed by applying a photocurable polymer composition to a substrate, irradiating the coating film with light in accordance with a pattern, and washing and removing a film which is not irradiated with light and is not cured. A large number of photocurable polymer compositions for forming patterned transparent films as described above have been proposed (JP-A-2001-261761).

Meanwhile, various kinds of patterning according to an ink-jet mode have been proposed in recent years (JP-A-10-12377). Performing ink-jet patterning requires the formation of a partition (bank material) between pixels in some cases. The bank material, which can be formed by using a photocurable polymer composition, is required to have a property that a liquid substance ejected from an ink-jet head nozzle does not adhere to the bank material, that is, liquid repellency.

BRIEF SUMMARY OF THE INVENTION

An object of the invention is to provide a photocurable polymer composition which has excellent photosensitivity and/or excellent application uniformity and from which a film excellent in heat resistance and/or chemical resistance can be formed; a photocurable polymer composition as a resist material from which a film having a property such as developability and/or pattern formability can be formed; and a photocurable polymer composition from which a transparent film having high liquid repellency can be formed, preferably a photocurable polymer composition from which a bank material can be formed and from which a liquid substance adhering to the bank material in ink-jet patterning is easily removed.

Another object of the invention is to provide a transparent film, an insulating film, and/or a protective film by using the composition; and a display device having a spacer composed of these films.

It has been observed that a film excellent in the above-mentioned properties, in particular, developability, pattern formability, water repellency, or oil repellency can be formed by using a photocurable polymer composition that includes a combination of a fluorine-containing polymer (A) and a fluorine-free polymer (B).

A first aspect of the invention relates to a photocurable polymer composition described as follows:

[I] A photocurable polymer composition which includes a fluorine-containing polymer (A) and a fluorine-free polymer (B).

[II] The photocurable polymer composition according to [I], further including a polymerizable double bond-containing compound (C); and a photopolymerization initiator (D).

A second aspect of the invention relates to a film formed by using the above-mentioned photocurable polymer composition. A third aspect of the invention relates to a display device including a photospacer composed of the film.

Specifically, the invention includes:

[1] A photocurable polymer composition including a fluorine-containing polymer (A) and a fluorine-free polymer (B).

[2] The photocurable polymer composition according to [1], further including a polymerizable double bond-containing compound (C) and a photopolymerization initiator (D).

[3] The photocurable polymer composition according to [1] or [2], wherein the fluorine-containing polymer (A) is a copolymer produced from a radically-polymerizable fluorine-containing monomer (a1) represented by a general formula X—Y, in which X is a radically-polymerizable functional group and Y is a fluorine-containing functional group, and another radically-polymerizable monomer (a2).

[4] The photocurable polymer composition according to [3], wherein the radically-polymerizable functional group X is $CH_2=C(CH_3)$—COO— or $CH_2=CH$—COO—.

[5] The photocurable polymer composition according to [3] or [4], wherein the fluorine-containing functional group Y is a linear or branched fluoroalkyl which has approximately 1 to approximately 20 carbon atoms and in which arbitrary methylene may be replaced by oxygen, a fluoroaryl which has approximately 6 to approximately 20 carbon atoms and in which one or more hydrogen is replaced by fluorine or —$CF_3$, or a fluoroarylalkyl which has approximately 7 to approximately 20 carbon atoms and in which one or more hydrogen in the aryl is replaced by fluorine or —$CF_3$.

[6] The photocurable polymer composition according to [3] or [4], wherein the fluorine-containing functional group Y is 2,2,2-trifluoroethyl, 3,3,3-trifluoropropyl, 2,2,3,3-tetrafluoropropyl, 2,2,3,3,3-pentafluoropropyl, 3,3,4,4,4-pentafluorobutyl, or 3,3,4,4,5,5,6,6,6-nonafluorohexyl.

[7] The photocurable polymer composition according to [3] or [4], wherein the fluorine-containing functional group Y is represented by —$[(R—SiO_{1.5})(R_f—SiO_{1.5})_{n-1}]$; wherein $R_f$ is a linear or branched fluoroalkyl which has approximately 1 to approximately 20 carbon atoms and in which arbitrary methylene may be replaced by oxygen, a fluoroaryl which has approximately 6 to approximately 20 carbon atoms and in which one or more hydrogen is replaced by fluorine or —$CF_3$, a fluoroarylalkyl which has approximately 7 to approximately 20 carbon atoms and in which one or more hydrogen in the aryl is replaced by fluorine or —$CF_3$, a linear or branched alkyl which has approximately 1 to approximately 20 carbon atoms and does not contain fluorine and in which arbitrary methylene may be replaced by oxygen, an aryl which has approximately 6 to approximately 20 carbon atoms and does not contain fluorine, or an arylalkyl which has approximately 7 to approximately 20 carbon atoms and does not contain fluorine, and at least one of $R_f$ is fluoroalkyl, fluoroaryl, or fluoroarylalkyl; R is a single bond or alkylene which has approximately 1 to approximately 20 carbon atoms and in which arbitrary methylene may be replaced by oxygen; and n is an integer of approximately 4 to approximately 24.

[8] The photocurable polymer composition according to [7], wherein the fluorine-containing functional group Y is represented by the following formula (I):

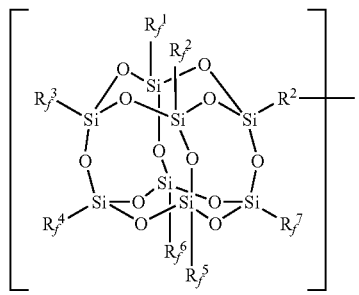

and wherein in the formula (I):

$R_f^1$ to $R_f^7$ are independently
  a linear or branched fluoroalkyl which has approximately 1 to approximately 20 carbon atoms and in which arbitrary methylene may be replaced by oxygen,
  a fluoroaryl which has approximately 6 to approximately 20 carbon atoms and in which one or more hydrogen is replaced by fluorine or $—CF_3$,
  a fluoroarylalkyl which has approximately 7 to approximately 20 carbon atoms and in which one or more hydrogen in the aryl is replaced by fluorine or $—CF_3$,
  a linear or branched alkyl which has approximately 1 to approximately 20 carbon atoms and does not contain fluorine, and in which arbitrary methylene may be replaced by oxygen,
  an aryl which has approximately 6 to approximately 20 carbon atoms and does not contain fluorine, or
  an arylalkyl which has approximately 7 to approximately 20 carbon atoms and does not contain fluorine; and
at least one of $R_f^1$ to $R_f^7$ is fluoroalkyl, fluoroaryl, or fluoroarylalkyl; and
$R^2$ is a single bond or alkylene which has approximately 1 to approximately 20 carbon atoms and in which arbitrary methylene may be replaced by oxygen.

[9] The photocurable polymer composition according to [8], wherein $R_f^1$ to $R_f^7$ are independently selected from fluoroalkyl.

[10] The photocurable polymer composition according to [9], wherein $R_f^1$ to $R_f^7$ are independently 2,2,2-trifluoroethyl, 3,3,3-trifluoropropyl, 2,2,3,3-tetrafluoropropyl, 2,2,3,3,3-pentafluoropropyl, 3,3,4,4,4-pentafluorobutyl, or 3,3,4,4,5,5,6,6,6-nonafluorohexyl.

[11] The photocurable polymer composition according to [10], wherein $R_f^1$ to $R_f^7$ are independently 2,2,2-trifluoroethyl, 3,3,3-trifluoropropyl, or 3,3,4,4,5,5,6,6,6-nonafluorohexyl.

[12] The photocurable polymer composition according to any one of [8] to [11], wherein $R^2$ is ethylene, propylene, or butylene.

[13] The photocurable polymer composition according to [12], wherein $R^2$ is propylene.

[14] The photocurable polymer composition according to any one of [3] to [13], wherein the radically-polymerizable monomer (a2) has a crosslinkable functional group.

[15] The photocurable polymer composition according to [14], wherein the crosslinkable functional groups is epoxy and/or oxetanyl.

[16] The photocurable polymer composition according to any one of [1] to [15], wherein the fluorine-free polymer (B) is a copolymer produced from a radically-polymerizable carboxyl-containing monomer (b1) and another radically-polymerizable monomer (b2).

[17] The photocurable polymer composition according to [16], wherein the radically-polymerizable carboxyl-containing monomer (b1) is (meth)acrylic acid.

[18] The photocurable polymer composition according to [16], wherein the radically-polymerizable carboxyl-containing monomer (b1) is methacrylic acid; and the radically-polymerizable monomer (b2) contains at least one of benzyl (meth)acrylate, N-phenylmaleimide, 2-hydroxyethyl (meth)acrylate, styrene, glycidyl (meth)acrylate, 3-ethyl-3-oxetanylmethyl (meth)acrylate, cyclohexyl (meth)acrylate, and a radically-polymerizable monomer represented by the following Formula (II):

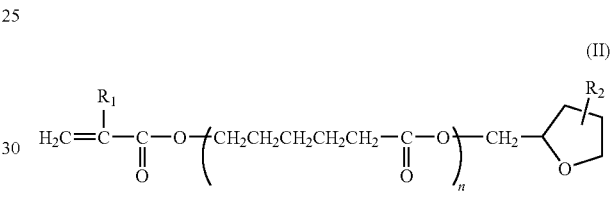

wherein Formula (II), $R_1$ is hydrogen or methyl, $R_2$ is hydrogen or alkyl having approximately 1 to approximately 5 carbon atoms, and n is an integer of approximately 1 to approximately 5.

[19] The photocurable polymer composition according to any one of [2] to [18], wherein approximately 50 wt % or more of the polymerizable double bond-containing compound (C) is a compound having two or more polymerizable double bonds.

[20] The photocurable polymer composition according to any one of [2] to [18], wherein approximately 50 wt % or more of the polymerizable double bond-containing compound (C) is a compound having four or more polymerizable double bonds.

[21] The photocurable polymer composition according to any one of [2] to [20], wherein the photopolymerization initiator (D) contains at least one selected from the group consisting of 2-methyl-1-[4-(methylthio)phenyl]-2-morpholinopropan-1-one, 2-benzyl-2-dimethylamino-1-(4-morpholiphenyl)-butanone-1,3,3,4,4-tetra-(t-butylperoxycarbonyl)benzophenone, 3,3'-di(methoxy carbonyl)4,4'-di(t-butylperoxycarbonyl)benzophenone, 3,4'-di(methoxycarbonyl)-4,3'-di(t-butylperox ycarbonyl)benzophenone, and 4,4'-di(methoxycarbonyl)-3,3'-di(t-butylperoxycarbonyl)benzophenone.

[22] The photocurable polymer composition according to any one of [2] to [20], wherein the photopolymerization initiator (D) contains at least one selected from the group consisting of 3,3'-di(methoxycarbonyl)-4,4'-di(t-butylperoxycarbonyl)benzophenone, 3,4'-di(methoxycarbonyl)-4,3'-di(t-butylperoxycarbonyl)benzophenone, and 4,4'-di(methoxycarbonyl)-3,3'-di(t-butylperoxycarbonyl) benzophenone.

[23] The photocurable polymer composition according to any one of [1] to [22], wherein the fluorine-containing polymer (A) is contained in an amount of approximately 1 to approximately 200 parts by weight with respect to approximately 100 parts by weight of the fluorine-free polymer (B).

[24] The photocurable polymer composition according to any one of [1] to [22], wherein the fluorine-containing polymer (A) is contained in an amount of approximately 5 to approximately 50 parts by weight with respect to approximately 100 parts by weight of the fluorine-free polymer (B).

[25] The photocurable polymer composition according to any one of [1] to [22], wherein the fluorine-containing polymer (A) is contained in an amount of approximately 10 to approximately 30 parts by weight with respect to approximately 100 parts by weight of the fluorine-free polymer (B).

[26] A transparent film obtained by using the photocurable polymer composition according to any one of [1] to [25].

[27] An insulating film obtained by using the photocurable polymer composition according to any one of [1] to [25].

[28] A protective film obtained by using the photocurable polymer composition according to any one of [1] to [25].

[29] A display device that includes a photospacer composed of the film according to any one of [26] to [28].

A film having excellent water repellency and/or excellent oil repellency and which is excellent in developability and/or pattern formability can be formed by using the photocurable polymer composition of the invention. The film can also be used as a spacer of a display device because it can be used as a transparent film, an insulating film, or a protective film.

DETAILED DESCRIPTION OF THE INVENTION

As described above, the photocurable polymer composition of the invention includes a fluorine-containing polymer (A) and a fluorine-free polymer (B), and preferably further includes a polymerizable double bond-containing compound (C) and a photopolymerization initiator (D). In addition, the photocurable polymer composition of the invention may contain any one or more of various additives as required.

Fluorine-Containing Polymer (A)

The fluorine-containing polymer (A) in the photocurable polymer composition of the invention is a polymer produced from a radically-polymerizable fluorine-containing monomer (a1), and is preferably a copolymer produced from the radically-polymerizable fluorine-containing monomer (a1) and a radically-polymerizable fluorine-free monomer (a2).

Each of the radically-polymerizable monomers (a1) and (a2) may be one kind of a compound, or may be a combination of two or more kinds of compounds.

The radically-polymerizable fluorine-containing monomer (a1) can be represented by a general formula X—Y where X is a radically-polymerizable functional group and Y is a fluorine-containing functional group. That is, the polymerizable monomer (a1) is preferably a fluorine compound having one radically-polymerizable functional group.

Examples of the radically-polymerizable functional group X include $CH_2=CH-$, $CH_2=CHO-$, $CH_2=C(CH_3)-COO-$, $CH_2=CH-COO-$, and a functional group represented by the formula (III). Of those, the functional group X is preferably $CH_2=C(CH_3)-COO-$ or $CH_2=CH-COO-$.

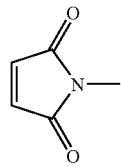

(III)

On the other hand, the fluorine-containing functional group Y is a group containing fluorine, and is not particularly limited. Examples of the functional group Y include (1) a linear or branched fluoroalkyl which has approximately 1 to approximately 20 carbon atoms and in which arbitrary methylene may be replaced by oxygen, (2) a fluoroaryl which has approximately 6 to approximately 20 carbon atoms and in which one or more hydrogen is replaced by fluorine or $-CF_3$, and (3) a fluoroarylalkyl which has approximately 7 to approximately 20 carbon atoms and in which one or more hydrogen in the aryl is replaced by fluorine or $-CF_3$. Furthermore, the fluorine-containing functional group Y may be (4) a fluorosilsesquioxane residue represented by $-[(R-SiO_{1.5})(R_f-SiO_{1.5})_{n-1}]$. Silsesquioxane is a compound having a structure generally represented by $(R'-SiO_{1.5})_n$ where R' is an arbitrary substituent.

"n" in the chemical formula $-[(R-SiO_{1.5})(R_f-SiO_{1.5})_{n-1}]$ for the functional group Y is preferably an integer of approximately 4 to approximately 24, and is more preferably approximately 8.

"R" in the formula $-[(R-SiO_{1.5})(R_f-SiO_{1.5})_{n-1}]$ is a single bond or an alkylene having approximately 1 to approximately 20 (preferably approximately 1 to approximately 10) carbon atoms. An arbitrary methylene in the alkylene may be replaced by oxygen, and an arbitrary hydrogen in the alkylene may be replaced by fluorine.

"$R_f$" in the chemical formula $-[(R-SiO_{1.5})(R_f-SiO_{1.5})_{n-1}]$ for the functional group Y is a group independently selected from the group consisting of (a) linear or branched fluoroalkyl which has approximately 1 to approximately 20 carbon atoms and in which an arbitrary methylene may be replaced by oxygen, (b) fluoroaryl which has approximately 6 to approximately 20 carbon atoms and in which at least one or more hydrogen is replaced by fluorine or $-CF_3$, (c) fluoroarylalkyl which has approximately 7 to approximately 20 carbon atoms and in which one or more hydrogen in the aryl is replaced by fluorine or $-CF_3$, and (d) linear or branched alkyl which has approximately 1 to approximately 20 carbon atoms and in which arbitrary methylene may be replaced by oxygen, aryl having approximately 6 to approximately 20 carbon atoms, and arylalkyl having approximately 7 to approximately 20 carbon atoms, and at least one of $R_f$ is any one of (a) to (c). $R_f$ may be different from or identical to one another.

Examples of the fluoroalkyl (1) for the functional group Y and examples of the fluoroalkyl (a) for the substituent $R_f$ in the silsesquioxane include trifluoromethyl, 2,2,2-trifluoroethyl, 3,3,3-trifluoropropyl, 2,2,3,3-tetrafluoropropyl, 2,2,3,3,3-pentafluoropropyl, 3,3,4,4,4-pentafluorobutyl, 2,2,2-trifluoro-1-trifluoromethylethyl, 2,2,3,4,4,4-hexafluorobutyl, 2,2,3,3,4,4,5,5-octafluoropentyl, nonafluoro-1,1,2,2-tetrahydrohexyl, 3,3,4,4,5,5,6,6-nonafluorohexyl, tridecafluoro-1,1,2,2-tetrahydrooctyl, heptadecafluoro-1,1,2,2-tetrahydrodecyl, perfluoro-1H,1H,2H,2H-dodecyl, perfluoro-1H,1H,2H-tetradecyl, tetradecyl-1,1,2,2-tetrahydrododecyl, and (3-heptafluoroisopropoxy)propyl.

Examples of the fluoroaryl (2) for the functional group Y and examples of the fluoroaryl (b) for the substituent $R_f$ in the silsesquioxane include pentafluorophenyl and α,α,α-trifluorotolyl.

Example of the fluoroarylalkyl (3) for the functional group Y and example of the fluoroarylalkyl (c) for the substituent R in the silsesquioxane includes pentafluorophenylpropyl.

Preferable examples of the functional group Y and preferable examples of the substituent $R_f$ in the silsesquioxane include 2,2,2-trifluoroethyl, 3,3,3-trifluoropropyl, 2,2,3,3-tetrafluoropropyl, 2,2,3,3,3-pentafluoropropyl, 3,3,4,4,4-pentafluorobutyl, and 3,3,4,4,5,5,6,6,6-nonafluorohexyl. More preferable examples thereof include 2,2,2-trifluoroethyl, 3,3,3-trifluoropropyl, and 3,3,4,4,5,5,6,6,6-nonafluorohexyl.

The functional group Y represented by the chemical formula $-[(R-SiO_{1.5})(R_f-SiO_{1.5})_{n-1}]$ is preferably a functional group having a T8-type silsesquioxane skeleton as represented by Formula (I).

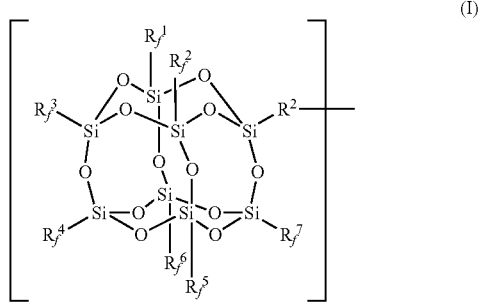

(I)

In Formula (I), each of $R_f^1$ to $R_f^7$ corresponds to the $R_f$ in $-[(R-SiO_{1.5})(R_f-SiO_{1.5})_{n-1}]$ as described above, and $R^2$ corresponds to R as described above.

In Formula (I), each of $R_f^1$ to $R_f^7$ are independently a group selected from: fluoroalkyls such as trifluoromethyl, 2,2,2-trifluoroethyl, 3,3,3-trifluoropropyl, 2,2,3,3-tetrafluoropropyl, 2,2,3,3,3-pentafluoropropyl, 2,2,2-trifluoro-1-trifluoromethylethyl, 2,2,3,4,4,4-hexafluorobutyl, 2,2,3,3,4,4,5,5-octafluoropentyl, nonafluoro-1,1,2,2-tetrahydrohexyl, tridecafluoro-1,1,2,2-tetrahydrooctyl, heptadecafluoro-1,1,2,2-tetrahydrodecyl, perfluoro-1H,1H,2H,2H-dodecyl, perfluoro-1H,1H,2H,2H-tetradecyl, and 3,3,4,4,5,5,6,6,6-nonafluorohexyl; and hydrocarbon groups such as phenyl, propyl, butyl, methylphenyl, ethylphenyl, and propylphenyl; provided that at least one of $R_f^1$ to $R_f^7$ is selected from fluoroalkyls.

It is more preferable that each of $R_f^1$ to $R_f^7$ are the same group selected from 2,2,2-trifluoroethyl, 3,3,3-trifluoropropyl, 2,2,3,3-tetrafluoropropyl, and 3,3,4,4,5,5,6,6,6-nonafluorohexyl.

It is further more preferable that each of $R_f^1$ to $R_f^7$ are the same group selected from 3,3,3-trifluoropropyl and 3,3,4,4,5,5,6,6,6-nonafluorohexyl.

In addition, in Formula (I), $R^2$ is preferably alkylene having approximately 1 to approximately 10 carbon atoms in which arbitrary methylene may be replaced by oxygen and arbitrary hydrogen may be replaced by fluorine. $R^2$ is more preferably ethylene, propylene, or butylene, and is still more preferably propylene.

As described above, the fluorine-containing polymer (A) is a polymer produced from the radically-polymerizable fluorine-containing monomer (a1), and is preferably a copolymer produced from the radically-polymerizable monomer (a1) and the other radically-polymerizable monomer (a2). The radically-polymerizable monomer (a2) contains a radically-polymerizable functional group, and preferably further contains a crosslinkable functional group.

Examples of the radically-polymerizable functional group for the radically-polymerizable monomer (a2) are similar to those of the radically-polymerizable functional group X for the radically-polymerizable monomer (a1). Therefore, the radically-polymerizable monomer (a2) is preferably a (meth)acrylic acid derivative or a styrene derivative. The term "(meth)acrylic" is a generic name representing acryl and methacryl.

Examples of the crosslinkable functional group for the radically-polymerizable monomer (a2) include: epoxy such as glycidyl; oxetanyl; isocyanate; anhydride; carboxyl; and hydroxyl. Of those, epoxy such as glycidyl and oxetanyl are preferable.

Thus, preferable examples of the radically-polymerizable crosslinkable functional group-containing monomer (a2) include: hydroxyalkyl (meth)acrylate such as 2-hydroxyethyl (meth)acrylate and 2-hydroxypropyl (meth)acrylate; glycidyl (meth)acrylate; 3-ethyl-3-(meth)acryloyloxymethyloxetane; 2-(meth)acryloyloxyethylisocyanate; γ-(methacryloyloxypropyl) trimethoxysilane; (meth)acrylate derivative such as 2-aminoethyl (meth)acrylate; and styrene derivative such as glycidyl vinyl benzyl ether.

As described above, the polymer (A) in the photocurable polymer composition of the invention is preferably a copolymer produced from the radically-polymerizable monomers (a1) and (a2), which may be an orderly-arranged polymer such as a block copolymer or a random copolymer.

In addition, the weight ratio of (a1):(a2) between a structural unit derived from the monomer (a1) (hereinafter referred to as the "structural unit (a1)") and a structural unit derived from the monomer (a2) (hereinafter referred to as the "structural unit (a2)") is preferably approximately 2: approximately 98 to approximately 30: approximately 70.

The weight-average molecular weight of the polymer (A) in the photocurable polymer composition of the invention varies depending on, for example, the kind of a monomer as a raw material for the polymer, and is preferably approximately 2,000 to approximately 50,000. In addition, the molecular weight distribution Mw/Mn of the polymer (A) is preferably approximately 1.5 to approximately 3.5.

The polymer (A) can impart water repellency and/or oil repellency to a film formed of the photocurable polymer composition of the invention because the polymer contains fluorine. In addition, as described above, when the monomer (a2) contains a crosslinkable functional group, the crosslinkable functional group is introduced into the polymer (A), which improves the chemical resistance of the resist pattern of a film formed of the photocurable polymer composition of the invention.

The polymer (A) in the photocurable polymer composition of the invention can be produced by subjecting the monomer (a1) alone to addition polymerization, or subjecting the monomer (a1) and the monomer (a2) to addition copolymerization, by means of an arbitrary method. The addition polymerization can be performed by using a polymerization initiator. Examples of the polymerization initiator include radical polymerization initiators such as: azo compounds such as 2,2'-azobisisobutyronitrile, 2,2'-azobis(2,4-dimethylvaleronitrile), 2,2'-azobis(2-butyronitrile), dimethyl-2,2'-azobisisobutyrate, and 1,1'-azobis(cyclohexane-1-carbonitrile); peroxides such as benzoyl peroxide, lauryl peroxide, octanoyl peroxide, acetyl peroxide, di-t-butyl peroxide, t-butylcumyl peroxide, dicumyl peroxide, t-butyl peroxyacetate, t-butyl peroxybenzoate and t-butyl peroxyneodecanoate; and dithiocarbamates such as tetraethylthiuram disulfide. Examples of the polymerization initiator also include photopolymerization initiators and living radical polymerization initiators.

The amount of a polymerization initiator to be used in the addition polymerization is not particularly limited, and preferably approximately 0.1 to approximately 10 wt % (percent by weight) with respect to the total monomer weight.

A chain transfer agent may be used in the addition polymerization. The use of chain transfer agent allows a molecular weight to be appropriately controlled. Examples of the chain transfer agent include: mercaptans such as thio-β-naphthol, thiophenol, n-butylmercaptan, ethyl thioglycolate, mercaptoethanol, mercaptoacetic acid, isopropylmercaptan, t-butylmercaptan, dodecanethiol, thiomalic acid, pentaerythritol tetra (3-mercaptopropionate), and pentaerythritol tetra(3-mercaptoacetate); disulfides such as diphenyl disulfide, diethyl dithioglycolate, and diethyl disulfide; toluene; methyl isobutyrate; carbon tetrachloride; isopropylbenzene; diethyl ketone; chloroform; ethylbenzene; butyl chloride; sec-butyl alcohol; methyl ethyl ketone; methyl isobutyl ketone; propylene chloride; methyl chloroform; t-butylbenzene; n-butyl alcohol; isobutyl alcohol; acetic acid; ethyl acetate; acetone; dioxane; ethane tetrachloride; chlorobenzene; methylcyclohexane; t-butyl alcohol; and benzene.

The chain transfer agent is preferably any one of the mercaptans. In particular, mercaptoacetic acid can reduce the molecular weight of a polymer to provide a uniform molecular weight distribution. One kind of a chain transfer agent may be used alone, or two or more kinds of chain transfer agents may be used in combination.

A specific method of producing the polymer of the invention may be similar to an ordinary method of producing an addition polymer. For example, a solution polymerization method, an emulsion polymerization method, a suspension polymerization method, a bulk polymerization method, a bulk-suspension polymerization method, or a polymerization method using supercritical $CO_2$ can be employed.

When the polymer is produced by means of a solution polymerization method, the following procedure may be adopted: a monomer (a), and, as required, a monomer (b), a polymerization initiator and a chain transfer agent are dissolved into an appropriate solvent, and the solution is heated or irradiated with light so that an addition polymerization reaction is initiated.

Examples of a solvent to be used in a polymerization reaction include: hydrocarbon-based solvents (such as benzene and toluene); ether-based solvents (such as diethyl ether, tetrahydrofuran, diphenyl ether, anisole, and dimethoxybenzene); halogenated hydrocarbon-based solvents (such as methylene chloride, chloroform, and chlorobenzene); ketone-based solvents (such as acetone, methyl ethyl ketone, and methyl isobutyl ketone); alcohol-based solvents (such as methanol, ethanol, propanol, isopropanol, n-butyl alcohol, and tert-butyl alcohol); nitrile-based solvents (such as acetonitrile, propionitrile, and benzonitrile); ester-based solvents (such as ethyl acetate and butyl acetate); carbonate-based solvents (such as ethylene carbonate and propylene carbonate); amide-based solvents (N,N-dimethylformamide and N,N-imethylacetamide); hydrochlorofluorocarbon-based solvents (HCFC-141b and HCFC-225); hydrofluorocarbon (HFCs)-based solvents (HFCs each having 2 to 4, 5, or 6 or more carbon atoms); perfluorocarbon-based solvents (perfluoropentane and perfluorohexane); alicyclic hydrofluorocarbon-based solvents (fluorocyclopentane and fluorocyclobutane); oxygen-containing fluorine-based solvents (fluoroether, fluoropolyether, fluoroketone, and fluoroalcohol); aromatic fluorine solvents ($\alpha,\alpha,\alpha$-trifluorotoluene and hexafluorobenzene); and water. One kind of those solvents may be used alone, or two or more kinds of them may be used in combination.

The amount of a solvent to be used may be such an amount that the monomer concentration is approximately 10 to approximately 50 wt %.

A reaction temperature is not particularly limited. The reaction temperature may be approximately 0 to approximately 200° C., and is preferably approximately room temperature to approximately 150° C. The polymerization reaction can be performed under reduced pressure, normal pressure, or increased pressure depending on the kind of a monomer and the kind of a solvent.

The polymerization reaction is preferably performed in an inert gas atmosphere, such as nitrogen or argon, for suppressing a reduction in polymerization velocity as a result of the deactivation of a generated radical due to contact between the radical and oxygen, and obtaining a polymer with an appropriately controlled molecular weight. Furthermore, the polymerization reaction is preferably performed in a polymerization system from which dissolved oxygen has been removed under reduced pressure (the polymerization reaction may be performed under reduced pressure immediately after dissolved oxygen has been removed under reduced pressure).

A polymer obtained in a solution may be purified or isolated by any of the ordinary methods familiar to those skilled in the art.

Fluorine-Free Polymer (B)

As described above, the photocurable polymer composition of the invention contains the fluorine-free polymer (B). The polymer (B) is not particularly limited as long as it is a polymer containing no fluorine, and preferably a copolymer produced from a radically-polymerizable carboxyl-containing monomer (b1) and another radically-polymerizable monomer (b2).

Each of the monomers (b1) and (b2) may be one kind of a compound, or may be a combination of two or more kinds of compounds.

Examples of the radically-polymerizable carboxyl-containing monomer (b1) include acrylic acid, methacrylic acid, and itaconic acid. Of those, methacrylic acid is preferable.

The use of the radically-polymerizable carboxyl-containing monomer (b1) introduces the carboxyl into the polymer (B). As a result, the developability upon alkali development of the photocurable polymer composition of the invention comprising the polymer (B) into which a carboxyl group has been introduced can be improved when the composition is used as a negative resist material.

The other radically-polymerizable monomer (b2) is not particularly limited as long as it is a compound that contains a radically-polymerizable functional group but contains no fluorine and no carboxyl. Examples of the monomer (b2) include benzyl methacrylate, N-phenylmaleimide, 2-hydroxyethyl methacrylate, styrene, glycidyl methacrylate, 3-ethyl-3-oxetanylmethyl (meth)acrylate, cyclohexyl (meth)acrylate, and a compound represented by the following formula (II). More preferable examples of the monomer include benzyl methacrylate, a compound represented by the following formula (II), N-phenylmaleimide, and 2-hydroxyethyl methacrylate.

A film excellent in developability, adhesiveness to a substrate, and heat resistance can be formed by using a photocurable polymer composition containing the polymer (B) obtained by using any one of those compounds as the monomer (b2).

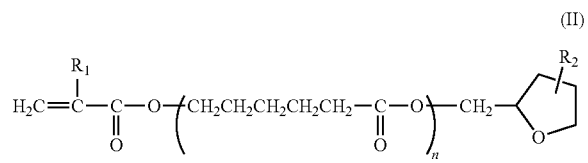

In Formula (II), $R_1$ is hydrogen or methyl, $R_2$ is hydrogen or alkyl having approximately 1 to approximately 5 carbon atoms, and n is an integer of approximately 1 to approximately 5.

The polymer (B) is a copolymer produced by the monomers (b1) and (b2); and may be an orderly-arranged polymer such as a block copolymer or a random copolymer.

In addition, a weight ratio (b1):(b2) between a structural unit derived from the monomer (b1) in the polymer (B) (hereinafter referred to as the "structural unit (b1)") and a structural unit derived from the monomer (b2) in the polymer (B) (hereinafter referred to as the "structural unit (b2)") is preferably approximately 10: approximately 90 to approximately 30: approximately 70.

The weight-average molecular weight Mw of the polymer (B) varies depending on, for example, the kind of a monomer as a raw material for the polymer, and is approximately 2,000 to approximately 30,000 in general. In addition, the molecular weight distribution Mw/Mn of the polymer (B) is preferably approximately 1.5 to approximately 3.5.

The polymer (B) can impart excellent developability upon formation of a film from the photocurable polymer composition of the invention. In particular, the carboxyl-containing polymer (B) can improve the developability of a film formed of the photocurable polymer composition of the invention, because the polymer can be easily washed and removed by using a developing solution in alkali development.

The polymer (B) in the photocurable polymer composition of the invention can be produced by subjecting the monomer (b1) and the monomer (b2) to an addition copolymerization reaction by means of an arbitrary method. To be specific, the polymer can be produced in the same manner as in the production of the polymer (A).

Polymerizable Double Bond-Containing Compound (C)

As described above, the photocurable polymer composition of the invention preferably contains the polymerizable double bond-containing compound (C). The term "polymerizable double bond" refers to a carbon-carbon double bond capable of addition polymerization. Examples of the polymerizable double bond include (meth)acryl and styryl. Of those, (meth)acryl is preferable. The polymerizable double bond-containing compound (C) may be one kind of a compound, or may be constituted by two or more kinds of compounds.

The polymerizable double bond-containing compound (C) of the invention is composed of a compound having one or more polymerizable double bonds; and it is preferable that at least part of the compound (C) is a compound having two or more double bonds for improving the curability of the photocurable polymer composition of the invention.

Examples of the compound having one polymerizable double bond include: (meth)acrylic acid; alkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, and stearyl (meth)acrylate; aryl (meth)acrylates such as phenyl (meth)acrylate and tolyl (meth)acrylate; a arylalkyl (meth)acrylate such as benzyl (meth)acrylate; alkoxyalkyl (meth)acrylates such as 2-methoxyethyl (meth)acrylate, 3-methoxypropyl (meth)acrylate, and 3-methoxybutyl (meth)acrylate; an ethylene oxide adduct of (meth)acrylic acid; 2-(2-bromopropionyloxy)ethyl (meth)acrylate and 2-(2-bromoisobutyryloxy) ethyl (meth)acrylate; and 1-(meth)acryloxy-2-phenyl-2-(2,2,6,6-tetramethyl-1-piperidinyloxy) ethane and 1-(4-((4-(meth)acryloxy)ethoxyethyl)phenylethoxy)piperidine.

Examples of the compound having two polymerizable double bonds include ethylene glycol di(meth)acrylate, diethylene glycol di(meth)acrylate, triethylene glycol di(meth)acrylate, tetraethylene glycol di(meth)acrylate, polyethylene glycol di(meth)acrylate, epichlorohydrin-denatured ethylene glycol di(meth)acrylate, epichlorohydrin-denatured diethylene glycol di(meth)acrylate, epichlorohydrin-denatured triethylene glycol di(meth)acrylate, epichlorohydrin-denatured tetraethylene glycol di(meth)acrylate, epichlorohydrin-denatured polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, epichlorohydrin-denatured propylene glycol di(meth)acrylate, epichlorohydrin-denatured dipropylene glycol di(meth)acrylate, epichlorohydrin-denatured tripropylene glycol di(meth)acrylate, epichlorohydrin-denatured tetrapropylene glycol di(meth)acrylate, epichlorohydrin-denatured polypropylene glycol di(meth)acrylate, glycelol acrylate methacrylate, glycelol di(meth)acrylate, 1,6-hexanediol di(meth)acrylate, epichlorohydrin-denatured 1,6-hexanediol di(meth)acrylate, methoxylated cyclohexyl di(meth)acrylate, neopentyl glycol di(meth)acrylate, neopentyl glycol hydroxypivalate di(meth)acrylate, caprolactone-denatured neopentyl glycol hydroxypivalate di(meth)acrylate, stearic acid-denatured pentaerythritol di(meth)acrylate, allylated cyclohexyl di(meth)acrylate, bis [(meth)acryloxy neopentyl glycol] adipate, bisphenol A di(meth)acrylate, ethylene oxide-denatured bisphenol A di(meth)acrylate, bisphenol F di(meth)acrylate, ethylene oxide-denatured bisphenol F di(meth)acrylate, bisphenol S di(meth)acrylate, ethylene oxide-denatured bisphenol S di(meth)acrylate, 1,4-butanediol di(meth)acrylate, 1,3-butylene glycol di(meth)acrylate, dicyclopentanyl diacrylate, ethylene oxide-denatured phosphate di(meth)acrylate, caprolactone, ethylene oxide-denatured phosphate di(meth) acrylate, epichlorohydrin-denatured phthalate di(meth)acrylate, tetrabromobisphenol A di(meth)acrylate, triglycerol di(meth)acrylate, and neopentyl glycol-denatured trimethylol propane di(meth)acrylate.

Examples of the compound having three polymerizable double bonds include trimethylolpropane tri(meth)acrylate, ethylene oxide-denatured trimethylolpropane tri(meth)acrylate, propylene oxide-denatured trimethylolpropane tri(meth)acrylate, epichlorohydrin-denatured trimethylolpropane tri(meth)acrylate, glycerol tri(meth)acrylate, epichlorohydrin-denatured glycerol tri(meth)acrylate, pentaerythritol tri(meth)acrylate, alkyl-denatured dipentaerythritol tri(meth)acrylate, ethylene oxide-denatured phosphate tri(meth)acrylate, caprolactone-ethylene oxide denatured phosphate tri(meth)acrylate, tris[(meth)acryloxyethyl] isocyanulate, caprolactone-denatured tris[(meth)acryloxyethyl] isocyanulate, and (meth)acrylated isocyanulate.

Examples of the compound having four polymerizable double bonds include ditrimethylolpropane tetra(meth)acrylate, diglycerin tetra(meth)acrylate, pentaerythritol tetra(meth)acrylate, and alkyl-denatured dipentaerythritol tetra(meth)acrylate.

Examples of the compound having five or more polymerizable double bonds include dipentaerythritol penta(meth)acrylate, alkyl-denatured dipentaerythritol penta(meth)acrylate, dipentaerythritol hexa(meth)acrylate, and caprolactone-denatured dipentaerythritol hexa(meth)acrylate, as well as EA-1020®, EA-1025®, EA-1026®, EA-1028®, EA-5520®, EA-5521®, EA-5821®, EA-5921®, EA-6320®, EA-6340®, EA-7120®, EA-7140®, EA-7420®, EA-7440®, U-15HA®, U6HA®, and U-6H®(all available from Shin Nakamura Chemical Co., Ltd).

It is preferable that approximately 50 wt % or more of the compound (C) in the photocurable polymer composition of the invention is a compound having two or more polymerizable double bonds, and it is more preferable that approximately 50 wt % or more of the compound (C) is a compound having four or more polymerizable double bonds. Of those, it is more preferable that the polymerizable double bond-containing compound (C) contains pentaerythritol triacrylate, pentaerythritol tetraacrylate, dipentaerythritol pentaacrylate, dipentaerythritol hexaacrylate, isocyanuric acid ethylene oxide-denatured triacrylate, EA-7440, U-15HA, U-6H, or a combination thereof because each of those compounds has an increasing effect on curing speed.

The polymerizable double bond-containing compound (C) in the photocurable polymer composition of the invention largely affects adhesiveness upon development. The adhesiveness upon development improves when approximately 20 wt % or more of the polymerizable double bond-containing compound (C) is a compound having three or more polymerizable double bonds.

The polymerizable double bond-containing compound (C) in the photocurable polymer composition of the invention largely affects a pattern size as well. In particular, the pattern size is close to mask dimensions when approximately 20 wt % or more of the compound polymerizable double bond-containing (C) is pentaerythritol tetraacrylate or ditrimethylolpropane tetraacrylate.

Photopolymerization Initiator (D)

As described above, the photocurable polymer composition of the invention preferably comprises a photopolymerization initiator (D). The photopolymerization initiator (D) is not particularly limited as long as it is a compound that generates a radical when irradiated with ultraviolet light or visible light. Examples of the photopolymerization initiator (D) include benzophenones, alkyl phenyl ketones, xanthones, benzoin alkyl ethers, triazines, and biimidazoles.

Examples of benzophenones include benzophenone, Michler's ketone, 4,4'-bis (diethylamino)benzophenone, 4,4'-di(t-butylperoxycarbonyl)benzophenone, 3,4,4'-tri(t-butylperoxy carbonyl)benzophenone, 3,3',4,4'-tetra(t-butylperoxycarbonyl)benzophenone, 3,3',4,4'-tetra(t-hexyl peroxycarbonyl)benzophenone, 3,3'-di(methoxycarbonyl)-4,4'-di(t-butylperoxycarbonyl) benzophenone, 3,4'-di(methoxycarbonyl)-4,3'-di(t-butylperoxycarbonyl) benzophenone, 4,4'-di(methoxycarbonyl)-3,3'-di(t-butylperoxycarbonyl)benzophenone, and benzanthrone.

Examples of alkyl phenyl ketones include acetophenone, 2-hydroxy-2-methylpropiophenone, 2-hydroxy-2-methyl-4'-isopropylpropiophenone, 1-hydroxycyclohexylphenyl ketone, 2,2-diethoxyacetophenone, 2,2-dimethoxy-2-phenylacetophenone, and 1-hydroxycyclohexylphenyl ketone.

Examples of xanthones include xanthone, thioxanthone, isopropylxanthone, 2,4-diethylthioxanethone, and 2-ethylanthraquinone.

Examples of benzoinalkylethers include isopropylbenzoinether and isobutylbenzoinether.

Examples of triazines include 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-s-4,6-bis(trichloromethyl)-s-triazine, 2-(2'-methoxystyryl)-4,6-bis(trichloromethyl)-s-triazine, 2(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, and 1,3-bis(trichloromethyl)-5-(4'-methoxyphenyl)-s-triazine.

Examples of biimidazoles include 2-(o-chlorophenyl)4,4',5,5'-tetraphenyl-1,2'-biimidazole, 2,2'-bis(2-chlorophenyl)4,4',5,5'-tetrakis(4-ethoxycarbonylphenyl)-1,2'biimidazole, 2,2'-bis(2,4-dichlorophenyl)4,4',5,5'-tetraphenyl-1,2'-biimidazole, 2,2'-bis(2,4-dibromophenyl)-4,4',5,5'-tetraphenyl-1,2'-biimidazole, and 2,2'-bis(2,4,6-trichlorophenyl)4,4',5,5'-tetraphenyl-1,2'-biimidazole.

Examples of other photopolymerization initiators include camphorquinone, 2-methyl-1-[4-(methylthio)phenyl]-2-morpholinopropan-1-one, 2-benzyl-2-dimethylamino-1-(4-morpholinophenyl)-butanone-1, ethyl 4-dimethylamino benzoate, isoamyl 4-dimethylamino benzoate, 2,4,6-trimethyl benzoyl diphenylphosphine oxide, 2-(p-dimethylaminostyryl) benzoxazol, 2-(p-dimethylaminostyryl) benzthiazole, 2-mercaptobenzothiazole, 3,3'-carbonylbis(7-diethylaminocoumarin), 3-(2-methyl-2-dimethylaminopropionyl) carbazole, 3,6-bis(2-methyl-2-morpholinopropionyl)-9-n-dodecylcarbazole, and bis($\eta^5$-2,4-cyclopentadien-1-yl)-bis (2,6-difluoro-3-(1H-pyrrol-1-yl)-phenyl) titanium.

The photopolymerization initiator is not limited to those described above, and, for example, a known initiator may be used. For example, "Photosensitive material list book edited by the Technical Association of Photosensitive Polymers of Japan (the thirty-first day of March, 1996, published by BUN-SHIN)" describes photopolymerization initiators.

The photopolymerization initiator (D) in the photocurable polymer composition of the invention may be one kind of those compounds, or may be a combination of two or more kinds of them.

The photopolymerization initiator (D) is preferably benzophenone, for example, 3,3',4,4'-tetra(t-butylperoxycarbonyl)benzophenone, 3,3',4,4'-tetra(t-hexylperoxycarbonyl) benzophenone, 3,3'-di(methoxycarbonyl)-4,4'-di(t-butylperoxycarbonyl)benzophenone, 3,4'di(methoxycarbonyl)-4,3'-di(t-butylperoxycarbonyl)benzophenone, or 4,4'-di(methoxycarbonyl)-3,3'-di(t-butylperoxycarbonyl)benzophenone. Each of these compounds may be used alone or a combination of two or more compounds may be used.

In particular, each of 3,3'-di(methoxycarbonyl)-4,4'-di(t-butylperoxycarbonyl) benzophenone; 3,4'-di(methoxycarbonyl)-4,3'-di(t-butylperoxycarbonyl)benzophenone; and 4,4'-di(methoxycarbonyl)-3,3'-di(t-butylperoxycarbonyl) benzophenone has high solubility in any one of various solvents, and has high sensitivity. These compounds are preferable because each of them hardly crystallizes and hardly precipitates upon storage of the photocurable polymer composition. Therefore, the photopolymerization initiator (D) is preferably a mixture of the three benzophenones.

JP-A-2000-159827 describes a method of synthesizing each of the above compounds. A mixture of the above three kinds of compounds is obtained in accordance with the synthesis method. The mixture of the three kinds of compounds thus obtained is used in the examples to be described later, and is referred to as BT2.

Arbitrary Additives

As described above, the photocurable polymer composition of the invention may contain arbitrary additives. Adding appropriate additives can improve the resolution, application uniformity, developability, or adhesiveness of the photocurable polymer composition of the invention.

Examples of the additives include acryl-based, styrene-based, polyethyleneimine-based, or urethane-based polymer dispersants; anionic, cationic, nonionic, or fluorine-based surfactants; application property improvers such as a silicon-based resin; adhesiveness improvers such as a silane coupling agent; UV absorbers such as alkoxybenzophenones; aggregation inhibitors such as sodium polyacrylate; thermal crosslinking agents such as an epoxy compound, a melamine compound, and a bisazide compound; and alkali solubility promoters such as an organic carboxylic acid.

Specific examples of the additives include EFKA-745®, EFKA-46®, EFKA-47®, EFKA-47EA®, EFKA Polymer 100®, EFKA Polymer 400®, EFKA Polymer 401®, and EFKA Polymer 450® (each of which is manufactured by Morishita & Co., Ltd.); SOLSPERSE® 3000, 5000, 9000, 12000, 13240, 13940, 17000, 20000, 24000, 24000GR, 26000, 28000, and 32000 (each of which is manufactured by Zeneca); DISPERSE AID 6®, DISPERSE AID 8®, DISPERSE AID 15®, and DISPERSE AID 9100® (each of which is manufactured by SAN NOPCO LIMITED); POLYFLO No. 75®, POLYFLO No. 90®, and POLYFLO No. 95® (each of which is manufactured by KYOEISHA CHEMICAL Co., LTD); DISPERBYK 161®, DISPERBYK 162®, DISPERBYK 163®, DISPERBYK 164®, DISPERBYK 166®, DISPERBYK 170®, DISPERBYK 180®, DISPERBYK 181®, and DISPERBYK 182® (each of which is manufactured by BYK-Chemie); fluoroalkylbenzene sulfonate; fluoroalkyl carboxylate; fluoroalkyl polyoxyethylene ether; fluoroalkylammonium iodide; fluoroalkyl betaine; fluoroalkyl sulfonate; diglycerin tetrakis(fluoroalkylpolyoxyethyleneether); fluoroalkyl trimethyl ammonium salt; fluoroalkylamino sulfonate; polyoxyethylene nonylphenyl ether; polyoxyethylene octylphenyl ether; polyoxyethylene alkyl ether; polyoxyethylene lauryl ether; polyoxyethylene oleyl ether; polyoxyethylene tridecyl ether; polyoxyethylene cetyl ether; polyoxyethylene stearyl ether; polyoxyethylene laurate; polyoxyethylene oleate; polyoxyethylene stearate; polyoxyethylene laurylamine; sorbitan laurate; sorbitan palmitate; sorbitan stearate; sorbitan oleate; sorbitan fatty acid ester; polyoxyethylene sorbitan laurate; polyoxyethylene sorbitan palmitate; polyoxyethylene sorbitan stearate; polyoxyethylene sorbitan oleate; polyoxyethylene naphthyl ether; alkylbenzene sulfonate; alkyl diphenyl ether disulfonate; BYK 300®, BYK 306®, BYK 310®, BYK 320®, BYK 330®, BYK 344®, and BYK 346® (each of which is manufactured by BYK-Chemie); POLYFLO No. 45® and POLYFLO KL-245® (each of which is manufactured by KYOEISHA CHEMICAL Co., LTD); and a bisphenol A type epoxy resin. It is preferable to use at least one selected from those.

Further preferable examples of the additives include fluoroalkylbenzene sulfonate, fluoroalkyl carbonate, fluoroalkylpolyoxyethyleneether, fluoroalkylammonium iodide, fluoroalkyl betaine, fluoroalkyl sulfonate, diglycerin tetrakis(fluoroalkylpolyoxyethyleneether), fluoroalkyl trimethyl ammonium salt, fluoroalkylamino sulfonate, BYK306®, BYK344®, and a bisphenol A epoxy resin. Adding each of them can enhance coating uniformity of the photo-curable polymer composition.

Solvent

It is preferable that the photocurable polymer composition of the invention contains a solvent, and that each of the components is dissolved into the solvent. Approximately 20 wt % or more of the solvent is preferably a compound having a boiling point of approximately 100° C. to approximately 200° C. The solvent may be one kind of a compound having a boiling point of approximately 100° C. to approximately 200° C., or may be a combination of two or more kinds of compounds each having a boiling point of approximately 100° C. to approximately 200° C.

Examples of the compound having a boiling point of approximately 100° C. to approximately 200° C. include water; aliphatic esters such as butyl acetate, butyl propionate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, methyl 3-oxypropionate, ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanate, and ethyl 2-oxobutanate; cyclic ethers such as dioxane; ketones such as cyclohexanone and cyclopentanone; aromatic compounds such as toluene and xylene; cyclic esters such as γ-butyrolactone; and N,N-dimethyl acetamide.

Another example of the compound having a boiling point of approximately 100° C. to approximately 200° C. includes glycol and derivatives thereof. Examples of glycol include ethylene glycol, diethylene glycol, triethylene glycol, propylene glycol, dipropylene glycol, tripropylene glycol, and 1,4-butanediol. Examples of the derivatives of glycol include glycol monoethers such as ethylene glycol monoisopropylether, ethylene glycol monobutylether, propylene glycol monomethylether, diethylene glycol monomethylether, diethylene glycol monoethylether, and diethylene glycol monobutylether; glycol monoether acetates such as propylene glycol monomethylether acetate, propylene glycol monoethylether acetate, propylene glycol monopropylether acetate, ethylene glycol monobutylether acetate, diethylene glycol monomethylether acetate, diethylene glycol monoethylether acetate, and diethylene glycol monobutylether acetate; and diethylene glycol dialkylethers such as diethylene glycol dimethylether, diethylene glycol diethylether, and diethylene glycol methylethylether.

Examples of the solvent of the photocurable polymer composition of the invention which are preferable for improving application uniformity include propylene glycol monomethyl ether; propylene glycol monomethyl ether acetate; propylene glycol monoethyl ether acetate; methyl 3-methoxypropionate; ethyl 3-ethoxypropionate; diethylene glycol monoethyl ether acetate; diethylene glycol monobutyl ether acetate; diethylene glycol dimethyl ether; diethylene glycol methylethyl ether; and ethyl lactate. More preferable examples of the solvent from the viewpoint of safety to a human body include: propylene glycol monomethyl ether acetate; methyl 3-methoxy propionate; ethyl 3-ethoxypropionate; diethylene glycol methylethyl ether; and ethyl lactate.

In addition, when the photocurable polymer composition of the invention is applied to a substrate or the like by using a slit coater (preferably used for application to a large-size substrate), from the viewpoint of an improvement in application uniformity of the composition, it is preferable to use any one of a mixed solvent of propylene glycol monomethyl ether acetate and diethylene glycol methylethyl ether; a mixed solvent of methyl 3-methoxypropionate and diethylene glycol methylethyl ether; and a mixed solvent of propylene glycol monomethyl ether acetate, methyl 3-methoxypropionate, and diethylene glycol methylethyl ether.

Photocurable Polymer Composition

As described above, the photocurable polymer composition of the invention includes the fluorine-containing polymer (A) and the fluorine-free polymer (B). A content ratio between the polymers (A) and (B) is such that the amount of the fluorine-containing polymer (A) is preferably approximately 1 to approximately 200 parts by weight, more preferably approximately 5 to approximately 50 parts by weight, and still more preferably approximately 10 to approximately 30 parts by weight with respect to approximately 100 parts by weight of the fluorine-free polymer (B). Some content of the fluorine-containing polymer (A) is necessary for impartment of preferable properties such as water repellency and oil repellency to a film formed by using the photocurable polymer composition of the invention. On the other hand, the content of the polymer (A) is preferably within the above range in order that solubility in a solvent may be achieved.

In another aspect, the photocurable polymer composition of the invention preferably includes approximately 20 to approximately 200 parts by weight, more preferably approximately 50 to approximately 150 parts by weight, and still more preferably approximately 70 to approximately 120 parts by weight of the polymerizable double bond-containing compound (C) with respect to 100 parts by weight of the fluorine-free polymer (B). When the amount of the compound (C) is excessively large or excessively small, the developability of a film obtained from the photocurable polymer composition degrades in some cases.

In another aspect, the photocurable polymer composition of the invention preferably includes approximately 1 to approximately 50 parts by weight, more preferably approximately 5 to approximately 30 parts by weight, and still more preferably approximately 7 to approximately 20 parts by weight of the photopolymerization initiator (D) with respect to approximately 100 parts by weight of the fluorine-free polymer (B).

The amount of the solvent in the photocurable polymer composition of the invention is preferably such that the concentration of a solid content (component except the solvent) with respect to the entirety of the composition is approximately 20 to approximately 45 wt %, for adjusting the application property of the composition.

The photocurable polymer composition of the invention is ordinarily produced by mixing and dissolving the polymer (A) and the polymer (B), and, preferably, the compound (C) and the photopolymerization initiator (D) in a solvent. A specific procedure is not particularly limited.

The photocurable polymer composition of the invention is preferably stored in a temperature range of approximately −5° C. to approximately 25° C. while light is shielded in order that the time-dependent stability of the composition may be favorably maintained. A storage temperature of approximately 0° C. to approximately 10° C. further improves time-dependent stability.

Film of the Invention

The photocurable polymer composition of the invention is applicable to a wide variety of applications, including its use as a negative resist material.

The term "negative resist material" refers to some kind of a photoresist material to be applied to a substrate. A film in accordance with a pattern can be formed by applying a photoresist material to a substrate; drying the formed coating film as required; exposing it to light via a mask having a pattern shape to cure an exposed portion; and dissolving and removing an unexposed part with a developing solution.

A film formed by using the photocurable polymer composition of the invention as a resist material is preferably a transparent film, and can also be used as an insulating film or a protective film. In addition, the film can be used as a photospacer in a liquid crystal display device.

The water repellency and oil repellency of the film are assumed to be derived from the fluorine-containing polymer (A), and it is assumed that these properties are exerted due to the localization of fluorine on the surface of the film.

Examples of the substrate to which the photocurable polymer composition of the invention is applied include a transparent glass substrate such as opaline plate glass, blue plate glass and silica-coated blue plate glass; a sheet, film or substrate made of a synthetic resin such as polycarbonate, polyester, an acrylic resin, a vinyl chloride resin, an aromatic polyamide resin, polyamideimide, or polyimide; a metal substrate such as an aluminum plate, a copper plate, a nickel plate, or a stainless plate; any other ceramic plate; and a semiconductor substrate having a photoelectric conversion element.

Each of those substrates may be subjected to a pretreatment as desired. Examples of the pretreatment include a treatment with such an agent as a silane coupling agent; a plasma treatment; ion plating; sputtering; a chemical vapor deposition method; and vacuum deposition.

A method of applying the photocurable polymer composition of the invention to a substrate is not particularly limited, and is selected from conventionally known methods such as a spin coating method, a roll coating method, a slit coating method, and a dipping method.

For example, a coating film formed of the photocurable polymer composition of the invention is dried by using a hot plate or oven at approximately 60 to approximately 120° C. for approximately 1 to approximately 5 minutes in ordinary cases.

The exposure of the coating film formed of the photocurable polymer composition of the invention to light can be performed by irradiating the film with ultraviolet light via a mask having a pattern shape. The dose of ultraviolet light is preferably approximately 5 to approximately 1,000 mJ with g, h, and i rays. In an exposed portion, a radical is generated by the decomposition of the photopolymerization initiator, whereby the polymerizable double bond-containing compound (C) is polymerized to be cured.

The film after the exposure is developed by dissolving and removing an unexposed part by using a developing solution. A preferable example of the developing solution includes an aqueous solution of alkali. Specific examples of the alkali include tetramethylammonium hydroxide, sodium carbonate, sodium hydrogen carbonate, potassium carbonate, potassium hydrogen carbonate, sodium hydroxide, and potassium hydroxide.

The developing solution may contain a surfactant for purposes of reducing a development residue and optimizing a pattern shape. A surfactant to be used can be selected from anionic, cationic, and nonionic surfactants. In particular, the addition of nonionic polyoxyethylene alkyl ether is preferable because it provides a good pattern shape.

A development method is not particularly limited, and any one or more of dip development, paddle development, and shower development can be employed. A film obtained as a result of development may be additionally post-baked.

The film of the invention is excellent in water repellency and oil repellency. The phrase "excellent in water repellency" means that a contact angle of water measured by means of, for example, a dropping method is approximately 70 degrees or more, and preferably approximately 80 degrees or more. The contact angle of water according to the dropping method is measured by using, for example, a FACE contact angle meter (image processing type) CA-X type (catalog name; manufactured by Kyowa Interface Science Co., Ltd.).

Display Device

The third aspect of the invention relates to a display device having a photospacer composed of the film of the invention. The film of the invention is a transparent film, and has a function as a protective film because it has insulating property and high hardness. Therefore, the film of the invention deforms a little owing to a pressure even when a small pattern is formed, so the film is preferably used as a photospacer in a display device. The spacer in the display device is preferably of a square shape, a rectangular shape, a circular shape, or an elliptical shape when viewed from directly above.

A film may be formed by forming a transparent electrode on a transparent film of the invention; performing patterning through etching; and subjecting the resultant to an orientation treatment. The transparent film has high resistance to sputtering. As a result, no wrinkle is generated in an insulating film even when the transparent electrode is formed, so high transparency can be maintained.

EXAMPLES

Hereinafter, the invention will be described in more detail by way of examples and the like. The following examples, however, are for illustrative purposes only and are not intended, nor should they be interpreted, to limit the scope of the invention.

Synthesis Example 1 of Fluorine-Containing Polymer (A)

A refluxing device was assembled, and 130 g of propylene glycol monomethyl ether acetate (hereinafter abbreviated as "PGMEA") was loaded. Then, the following reagents were added, and the whole was refluxed for 4 hours.

TABLE 1

| | |
|---|---|
| 2-Butanone | 200 g |
| γ-Methacryloxypropylhepta(trifluoropropyl)-T8-silsesquioxane | 10.0 g |
| Glycidyl Methacrylate | 40.0 g |
| 2,2'-Azobis(2,4-dimethylvaleronitrile) | 2.0 g |

After the completion of the reflux, 250 g of n-hexane was added to precipitate a polymer, and the supernatant was removed. Next, 50 g of 2-butanone was added to dissolve the polymer. Then, 150 g of n-hexane was added to precipitate the polymer again, and the supernatant was removed. Next, 40 g of 2-butanone and 130 g of PGMEA were added, and 2-butanone was removed by means of distillation. Furthermore, a trace amount of PGMEA was removed under reduced pressure, whereby a sample solution (A-1) was obtained.

After the solution (A-1) had been cooled to room temperature, the solution was sampled. Then, the sampled solution was dried at 220° C. for 30 minutes, and a reduction in weight was measured to determine a solid content concentration. The solution (A-1) had a solid content concentration of 37.5 wt %. In addition, the weight-average molecular weight Mw of the obtained polymer determined by means of GPC analysis was 6,000.

Synthesis Example 2 of Fluorine-Containing Polymer (A)

A refluxing device was assembled, and 150 g of PGMEA was loaded. Then, the following reagents were added, and the whole was refluxed for 4 hours.

TABLE 2

| | |
|---|---|
| 2-Butanone | 50.0 g |
| γ-Methacryloxypropylhepta(trifluoropropyl)-T8-silsesquioxane | 10.0 g |
| Glycidyl Methacrylate | 40.0 g |
| 2,2'-Azobis(2,4-dimethylvaleronitrile) | 2.0 g |

After the reflux, the temperature was raised to 100° C., and the resultant was distilled for 1 hour, whereby 2-butanone was distilled off. Next, PGMEA was distilled off under reduced pressure, and the distillation was stopped when the total amount of both distillates reached 100 g. Thus, a sample solution (A-2) was obtained.

The solid content concentration of the sample solution (A-2) calculated from the loading amounts was 33.3 wt %. The weight-average molecular weight Mw of the obtained polymer determined by means of GPC analysis was 4,400.

Synthesis Example 3 of Fluorine-Containing Polymer (A)

A refluxing device was assembled, the following reagents were added, and the whole was refluxed for 4 hours.

TABLE 3

| | |
|---|---|
| 2-Butanone | 160.0 g |
| 2,2,2-Trifluoroethyl methacrylate | 8.05 g |
| Glycidyl Methacrylate | 32.14 g |
| 2,2'-Azobis(2,4-dimethylvaleronitrile) | 2.0 g |

After the completion of the reflux, 200 g of n-hexane was added to precipitate a polymer, and the supernatant was removed. Next, 40 g of 2-butanone was added to dissolve the polymer. Then, 120 g of n-hexane was added to precipitate the polymer again, and the supernatant was removed. Next, 32 g of 2-butanone and 100 g of PGMEA were added, and the whole was distilled, whereby 2-butanone was removed. Furthermore, a trace amount of PGMEA was removed under reduced pressure, whereby a sample solution (A-3) was obtained.

After the sample solution (A-3) had been cooled to room temperature, part of the solution was sampled. Then, the sampled solution was dried at 220° C. for 30 minutes, and a reduction in weight was measured to determine a solid content concentration. The sample solution (A-3) had a solid content concentration of 37.9 wt %. In addition, the weight-average molecular weight of the obtained polymer determined by means of GPC analysis was 5,700.

Synthesis Example 1 of Fluorine-Free Polymer (B)

PGMEA (140 g) was loaded into a four-necked flask equipped with a stirring device, and the temperature of PGMEA was raised to 80° C. while nitrogen was bubbled. A dropping liquid prepared by uniformly dissolving the mixture shown in Table 4 was dropped to PGMEA at 80° C. over 3 hours. After the completion of the dropping, 20 g of PGMEA was added, and then the whole was stirred at 80° C. for 2 hours. After that, the temperature was raised to 100° C., followed by stirring for 1 hour, and then the reaction was completed. The resultant solution was defined as a sample solution (B-1).

TABLE 4

| PGMEA | 40.0 g |
|---|---|
| Benzyl Methacrylate | 50.0 g |
| Compound of Formula (II) | 10.0 g |
| N-Phenylmaleimide | 20.0 g |
| 2-hydroxyethyl methacrylate | 4.0 g |
| Methacrylic Acid | 16.0 g |
| 2,2-Azobis(2,4-dimethylvaleronitrile) | 4.0 g |

The solid content concentration of the sample solution (B-1) calculated from the loading amounts was 33.3 wt %. The weight-average molecular weight of the obtained polymer determined by means of GPC analysis was 3,000.

Synthesis Example 2 of Fluorine-Free Polymer (B)

PGMEA (120 g) was loaded into a four-necked flask equipped with a stirring device, and the temperature of PGMEA was raised to 80° C. while nitrogen was bubbled. A dropping liquid prepared by uniformly dissolving the mixture shown in Table 5 was dropped to PGMEA at 80° C. over 3 hours. After the completion of the dropping, 20 g of PGMEA was added, and then the whole was stirred at 80° C. for 2 hours. After that, the temperature was raised to 100° C., followed by stirring for 1 hour, and then the reaction was completed. The resultant solution was defined as a sample solution (B-2).

TABLE 5

| N-Phenylmaleimide | 10.0 g |
|---|---|
| Glycidyl Methacrylate | 40.0 g |
| 2,2-Azobis(2,4-dimethylvaleronitrile) | 4.0 g |
| PGMEA | 20.0 g |

After the sample solution (B-2) had been cooled to room temperature, part of the solution was sampled. Then, the sampled solution was dried at 220° C. for 30 minutes, and a reduction in weight was measured to determine a solid content concentration. The solution (B-2) had a solid content concentration of 25 wt %. In addition, the weight-average molecular weight of the obtained polymer determined by means of GPC analysis was 3,000.

Example 1

A photocurable polymer composition was obtained by mixing and dissolving the sample solution (A-1); the sample solution (B-1); pentaerythritol tetraacrylate (ARONIX® M450 manufactured by TOAGOSEI CO., LTD., hereinafter abbreviated as "M450") and pentaerythritol hexaacrylate (ARONIX® M402 manufactured by TOAGOSEI CO., LTD., hereinafter abbreviated as "M402") each serving as the polymerizable double bond-containing compound (C); BT2® (28-wt % anisole solution manufactured by CHISSO CORPORATION) serving as the photopolymerization initiator (D); 4-methoxyphenol (hereinafter abbreviated as "MQ") serving as a polymerization inhibitor; FTERGENT® DFX-18 (manufactured by NEOS COMPANY LIMITED, hereinafter abbreviated as "DFX-18") serving as a fluorine-based surfactant; EAB-F® (manufactured by HODOGAYA CHEMICAL CO., LTD.,hereinafter abbreviated as "EAB-F") serving as a sensitizer; and PGMEA and diethylene glycol methylethyl ether (hereinafter abbreviated as "EDM") each serving as a solvent in accordance with the formulation shown in Table 6.

TABLE 6

| EDM | 1.94 g |
|---|---|
| Sample Solution (A-1) (Solid Content Concentration 37.5 wt %) | 0.58 g |
| Sample Solution (B-1) (Solid Content Concentration 33.3 wt %) | 3.3 g |
| M450 | 0.55 g |
| M402 | 0.55 g |
| MQ | 0.006 g |
| BT2 | 0.12 g |
| EAB-F | 0.011 g |
| DFX-18 | 0.0018 g |

The resultant composition was applied by means of spin coating to a glass substrate at a coating frequency of 460 rpm for 10 seconds, whereby a coating film was obtained. The obtained coating film was dried on a hot plate at 100° C. for 2 minutes. The substrate having the dried film was subjected to proximity exposure. A proximity aligner TME-400PRC® manufactured by TOPCON CORPORATION) was used as an exposing device, light having a wavelength of 350 nm or less was cut off by using a wavelength cut-off filter, and g, h, and i rays were taken out and irradiated. An exposure value measured by using an accumulated light quantity meter UIT-102 and a photodetector UVD-365PD® (manufactured by Ushio Corporation) was 100 mJ/cm$^2$.

The glass substrate after the exposure was subjected to dip development with a 0.04-wt % aqueous solution of potassium hydroxide for 90 seconds, whereby an unexposed portion was removed. The substrate after the development was washed with pure water for 20 seconds, followed by drying.

A film remaining rate after the development "(film thickness after development/film thickness before development)× 100" was 90%, so it was confirmed that the resultant had sufficient sensitivity. A film thickness was calculated as an average value of film thicknesses at three sites measured by using a stylus thickness meter α STEP 200® (manufactured by KLA-Tencor Corporation).

After the development, the resultant was post-baked in an oven at 220° C. for 30 minutes. The contact angle (degrees) of the obtained sample substrate to each of water and diiodomethane was measured according to a dropping method by using a FACE contact angle meter (image processing type) CA-X type (catalog name; manufactured by Kyowa Interface Science Co., Ltd.), and a surface free energy (mN/m) was calculated by means of a two-liquid method (Kaelble-Uy method). Table 10 shows the obtained results.

Example 2

A photocurable polymer composition was obtained in the same manner as in Example 1 except that the sample solution (A-2) was used instead of the sample solution (A-1) as shown in Table 7.

TABLE 7

| | |
|---|---|
| EDM | 1.86 g |
| Sample Solution (A-2) (Solid Content Concentration 33.3 wt %) | 0.66 g |
| Sample Solution (B-1) (Solid Content Concentration 33.3 wt %) | 3.3 g |
| M450 | 0.55 g |
| M402 | 0.55 g |
| MQ | 0.006 g |
| BT2 | 0.12 g |
| EAB-F | 0.011 g |
| DFX-18 | 0.0018 g |

A sample substrate was obtained in the same manner as in Example 1 except that the obtained composition was applied at a coating frequency of 420 rpm; and a film thickness after post-baking was changed to 5 μm. A film remaining rate after the development was 92%. The obtained sample substrate was evaluated in the same manner as in Example 1. Table 10 shows the results.

Example 3

A photocurable polymer composition was obtained in the same manner as in Example 1 except that the sample solution (A-3) was used instead of the sample solution (A-1) as shown in Table 8.

TABLE 8

| | |
|---|---|
| EDM | 1.90 g |
| Sample Solution (A-3) (Solid Content Concentration 37.9 wt %) | 0.58 g |
| Sample Solution (B-1) (Solid Content Concentration 33.3 wt %) | 3.3 g |
| M450 | 0.55 g |
| M402 | 0.55 g |
| MQ | 0.006 g |
| BT2 | 0.12 g |
| EAB-F | 0.011 g |
| DFX-18 | 0.0018 g |

A sample substrate was obtained in the same manner as in Example 1 except that the obtained composition was applied at a coating frequency of 470 rpm; and a film thickness after post-baking was changed to 5 μm. A film remaining rate after the development was 91%. The obtained sample substrate was evaluated in the same manner as in Example 1. Table 10 shows the results.

Comparative Example 1

A photocurable polymer composition was obtained in the same manner as in Example 1 except that the sample solution (B-2) was used instead of the sample solution (A-1) as shown in Table 9.

TABLE 9

| | |
|---|---|
| EDM | 1.63 g |
| Sample Solution (B-1) (Solid Content Concentration 33.3 wt %) | 3.3 g |
| Sample Solution (B-2) (Solid Content Concentration 25.0 wt %) | 0.88 g |
| M450 | 0.55 g |
| M402 | 0.55 g |
| MQ | 0.006 g |
| BT2 | 0.12 g |
| EAB-F | 0.011 g |
| DFX-18 | 0.0018 g |

A sample substrate was obtained in the same manner as in Example 1 except that the obtained composition was applied at a coating frequency of 470 rpm; and a film thickness after post-baking was changed to 5 μm. A film remaining rate after the development was 92%. The obtained sample substrate was evaluated in the same manner as in Example 1. Table 10 shows the results.

TABLE 10

| | Example 1 | Example 2 | Example 3 | Comparative Example 1 |
|---|---|---|---|---|
| Contact Angle (water)/degrees | 86 | 91 | 75 | 59 |
| Contact Angle (diiodomethane)/degrees | 53 | 57 | 41 | 26 |
| Surface Free Energy/mN/m | 34 | 31 | 42 | 52 |

As shown in Table 10, films each formed of a photocurable polymer composition comprising a fluorine-containing polymer and a fluorine-free polymer have a large contact angle of water and diiodomethane. Therefore, those films are found to have higher water repellency, higher oil repellency, and lower surface free energy.

The invention provides an excellent liquid crystal panel with reduced defects that can be produced by using the photocurable polymer composition of the invention in a production process for use in a liquid crystal display device. Furthermore, when the photocurable polymer composition is used as a bank material upon patterning of an organic EL material or the like according to an ink-jet mode, there is a low possibility that the organic EL material or the like flows to an adjacent image forming portion. In addition, even when liquid substances adhere to the bank material, they can be easily removed.

While the invention has been described in detail with reference to preferred embodiments thereof, it will be apparent to one skilled in the art that various changes can be made, and equivalents employed, without departing from the scope of the invention. Thus, it is intended that the invention covers the modifications and variations of this invention that come within the scope of any claims and their equivalents. Each of the aforementioned documents, including the foreign priority document, JP 2005-283203, is incorporated by reference herein in its entirety.

What is claimed is:

1. A photocurable polymer composition comprising:
   (i) a fluorine-containing polymer (A); and
   (ii) a fluorine-free polymer (B),
   wherein the fluorine-containing polymer (A) is a copolymer produced from
   (I) at least one radically-polymerizable fluorine-containing monomer (a1) represented by a general formula X—Y, in which X is a radically-polymerizable functional group selected from the group consisting of $CH_2$=C($CH_3$)—COO— and $CH_2$=CH—COO—; and Y is a fluorine-containing functional group; and
   (II) another radically-polymerizable monomer (a2) having at least one crosslinkable functional group elected from the group consisting of epoxy and oxetanyl,
   wherein the fluorine-containing functional group Y is represented by the following Formula (I):

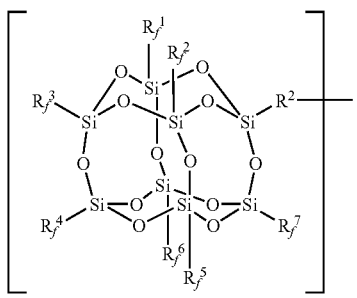

(I)

wherein in the Formula (I):

each of $R_f^1$ to $R_f^7$ are independently are at least one of (i) a linear or branched fluoroalkyl which has approximately 1 to approximately 20 carbon atoms and in which arbitrary methylene may be replaced by oxygen, (ii) a fluoroaryl which has approximately 6 to approximately 20 carbon atoms and in which one or more hydrogen is replaced by fluorine or —$CF_3$, (iii) a fluoroarylalkyl which has approximately 7 to approximately 20 carbon atoms and in which one or more hydrogen in the aryl is replaced by fluorine or —$CF_3$, (iv) a linear or branched alkyl which has approximately 1 to approximately 20 carbon atoms and does not contain fluorine, and in which arbitrary methylene may be replaced by oxygen, (v) an aryl which has approximately 6 to approximately 20 carbon atoms and does not contain fluorine, and (vi) an arylalkyl which has approximately 7 to approximately 20 carbon atoms and does not contain fluorine;

wherein at least one of $R_f^1$ to $R_f^7$ is fluoroalkyl, fluoroaryl, or fluoroarylalkyl; and wherein $R^2$ is a single bond or alkylene which has approximately 1 to approximately 20 carbon atoms and in which arbitrary methylene may be replaced by oxygen and wherein the fluorine-free polymer (B) is a copolymer produced from a radically-polymerizable carboxyl-containing monomer (b1) and another radically-polymerizable monomer (b2), and wherein the radically-polymerizable carboxyl-containing monomer (b1) is methacrylic acid; and the radically-polymerizable monomer (b2) contains at least one of benzyl (meth)acrylate, N-phenylmaleimide, 2-hydroxyethyl (meth)acrylate, styrene, glycidyl (meth)acrylate, 3-ethyl-3-oxetanylmethyl (meth)acrylate, cyclohexyl (meth)acrylate, and a radically-polymerizable monomer represented by the following Formula (II):

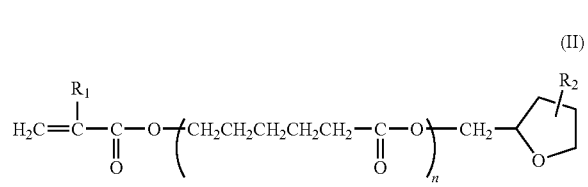

(II)

wherein Formula (II), $R_1$ is at least one of hydrogen and methyl, $R_2$ is at least one of hydrogen and alkyl having approximately 1 to approximately 5 carbon atoms, and n is an integer of approximately 1 to approximately 5.

2. The photocurable polymer composition according to claim 1, further comprising:
(i) a polymerizable double bond-containing compound (C); and
(ii) a photopolymerization initiator (D).

3. The photocurable polymer composition according to claim 1, wherein each of $R_f^1$ to $R_f^7$ is independently a fluoroalkyl.

4. The photocurable polymer composition according to claim 3, wherein each of $R_f^1$ to $R_f^7$ are independently at least one of 2,2,2-trifluoroethyl, 3,3,3-trifluoropropyl, 2,2,3,3-tetrafluoropropyl, 2,2,3,3,3-pentafluoropropyl, 3,3,4,4,4-pentafluorobutyl, and 3,3,4,4,5,5,6,6,6-nonafluorohexyl.

5. The photocurable polymer composition according to claim 4, wherein each of to $R_f^1$ to $R_f^7$ are independently at least one of 2,2,2-trifluoroethyl, 3,3,3-trifluoropropyl, and 3,3,4,4,5,5,6,6,6-nonafluorohexyl.

6. The photocurable polymer composition according to claim 1, wherein $R^2$ is at least one of ethylene, propylene, and butylene.

7. The photocurable polymer composition according to claim 6, wherein $R^2$ is propylene.

8. The photocurable polymer composition according to claim 2, wherein approximately 50 wt % or more of the polymerizable double bond-containing compound (C) is a compound having two or more polymerizable double bonds.

9. The photocurable polymer composition according to claim 2, wherein approximately 50 wt % or more of the polymerizable double bond-containing compound (C) is a compound having four or more polymerizable double bonds.

10. The photocurable polymer composition according to claim 2, wherein the photopolymerization initiator (D) contains at least one of 2-methyl-1-[4-(methylthio)phenyl]-2-morpholinopropan-1-one, 2-benzyl-2-dimethylamino-1-(4-morpholiphenyl)-butanone-1,3,3,4,4-tetra-(t-butylperoxycarbonyl)benzophenone, 3,3'-di(methoxycarbonyl)-4,4'-di(t-butylperoxycarbonyl) benzophenone, 3,4'-di(methoxycarbonyl)-4,3'-di(t-butylperoxycarbonyl) benzophenone, and 4,4'-di(methoxycarbonyl)-3,3'-di(t-butylperoxycarbonyl) benzophenone.

11. The photocurable polymer composition according to claim 2, wherein the photopolymerization initiator (D) contains at least one of 3,3'-di(methoxycarbonyl)-4,4'-di(t-butylperoxycarbonyl)benzophenone, 3,4'-di(methoxycarbonyl)-4,3'-di(t-butylperoxycarbonyl) benzophenone, and 4,4'-di(methoxycarbonyl)-3,3'-di(t-butylperoxycarbonyl) benzophenone.

12. The photocurable polymer composition according to claim 1, wherein the fluorine-containing polymer (A) comprises approximately 1 to approximately 200 parts by weight with respect to approximately 100 parts by weight of the fluorine-free polymer (B).

13. The photocurable polymer composition according to claim 1, wherein the fluorine-containing polymer (A) comprises approximately 5 to approximately 50 parts by weight with respect to 100 parts by weight of the fluorine-free polymer (B).

14. The photocurable polymer composition according to claim 1, wherein the Fluorine-containing polymer (A) comprises approximately 10 to approximately 30 parts by weight with respect to approximately 100 parts by weight of the fluorine-free polymer (B).

15. A transparent film comprising the photocurable polymer composition according to claim 1.

16. An insulating film comprising the photocurable polymer composition according to claim 1.

17. A protective film comprising the photocurable polymer composition according to claim 1.

18. A display device comprising a photospacer wherein the photospacer comprises the film according to claim 15.

* * * * *